United States Patent
Ezumi et al.

(10) Patent No.: US 6,536,651 B2
(45) Date of Patent: Mar. 25, 2003

(54) FRICTION STIR WELDING METHOD

(75) Inventors: Masakuni Ezumi, Kudamatsu (JP); Kazushige Fukuyori, Kudamatsu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/791,560

(22) Filed: Feb. 26, 2001

(65) Prior Publication Data

US 2002/0060237 A1 May 23, 2002

(30) Foreign Application Priority Data

Nov. 17, 2000 (JP) .......................... 2000-350412

(51) Int. Cl.[7] ................................................ B23K 20/12
(52) U.S. Cl. ...................................... 228/112.1; 228/2.1
(58) Field of Search .............................. 228/112.1, 2.1, 228/114, 135, 173.6

(56) References Cited

U.S. PATENT DOCUMENTS

| | | | | |
|---|---|---|---|---|
| 5,971,247 A | * | 10/1999 | Gentry | 228/2.1 |
| 5,979,742 A | * | 11/1999 | Enomoto et al. | 228/112.1 |
| 6,050,474 A | * | 4/2000 | Aota et al. | 228/112.1 |
| 6,227,433 B1 | * | 5/2001 | Waldron et al. | 228/112.1 |
| 6,247,633 B1 | * | 6/2001 | White et al. | 228/112.1 |
| 6,290,117 B1 | * | 9/2001 | Kawasaki et al. | 228/112.1 |

FOREIGN PATENT DOCUMENTS

EP    0810 054 A1  *  5/1997

* cited by examiner

Primary Examiner—M. Alexandra Elve
Assistant Examiner—Len Tran
(74) Attorney, Agent, or Firm—Antonelli, Terry, Stout & Kraus, LLP

(57) ABSTRACT

A plate 20 is stacked on a plate 10, the stacked surface of the plate 10 being provided with a groove 12. The outer portion of the plate 20 is equipped with a raised portion 22. A rotary tool 50 is inserted into the raised portion 22 for performing a friction stir welding. The groove 12 is filled up during the friction stir welding with the metal material constituting said raised portion 22. According to the present method, the pressure of the welding portion will not be excessive, and therefore the generation of a notch in the stacked surface is prevented. This provides a friction stir welding method which produces a lightweight joint having good characteristics.

5 Claims, 2 Drawing Sheets

FRICTION STIR WELDING METHOD

FIELD OF THE INVENTION

The present invention relates to a method for friction stir welding stacked surfaces.

DESCRIPTION OF THE RELATED ART

Friction stir welding is a method for joining members in which a round shaft (called a rotary tool) is rotated and inserted into a joint portion between the members, and the rotating tool is moved along the joint line, thereby heating, mobilizing and plasticising the material in the joint portion in order to perform solid-phase welding of the members. The rotary tool comprises a large-diameter portion and a small-diameter portion. The small-diameter portion is inserted into the joint between the members to be welded to an extent that the end surface of the large-diameter portion contacts the members. The small-diameter portion is provided with a screw thread on its outer surface.

Moreover, a raised portion is formed on the side of the members in the joint region where the rotary tool is to be inserted, so that the metal material that forms the raised portion forms a supply of material to fill the gap between the two members. The large-diameter portion of the rotary tool is dimensioned to accommodate the raised portion.

These features are disclosed in Japanese Patent Laid-Open Publication No. 11-90655 (U.S. Pat. No. 6050474).

SUMMARY OF THE INVENTION

Friction stir welding can be employed for joining stacked (superposed) surfaces. When the stacked members are to be joined through friction stir welding, a notch is formed on the stacked surfaces. An example is shown in FIG. 4 (A), which is a vertical cross-sectional view showing the members during friction stir welding, and in FIG. 4 (B), which is a vertical cross-sectional view showing the state of the welded joint after the friction stir welding. FIG. 4 (B) is a simplified explanatory view. The friction stir welding is performed by inserting a rotary tool 50 into the stacked members from the upper direction. The stirred region shown by the hatching and the stacked surface of the two members constitute a notch B knuckled to the upper side.

An object of the present invention is to provide a friction stir welding method which is capable of preventing the generation of notches at the stacked surfaces.

The present invention calls for stacking a first member and a second member, providing a groove on the stacked surface of the first member extending along the intended direction of the friction stir welding, and performing friction stir welding of the stacked surfaces along the groove using a rotary tool having a small-diameter portion with a diameter greater than the width of the groove.

DETAILED DESCRIPTION OF A PREFERRED EMBODIMENT

Figure 1:
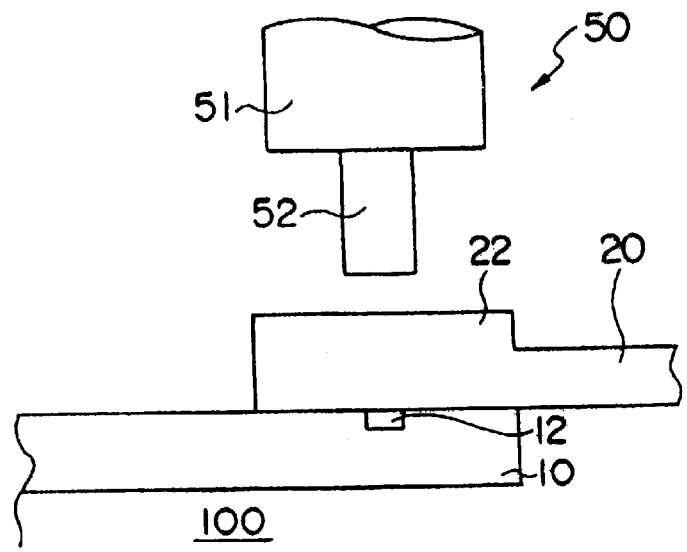
FIG. 1 is a vertical cross-sectional view showing the joint portion of two members to be welded according to one embodiment of the present invention.

One preferred embodiment of the present invention will now be explained with reference to FIGS. 1 through 3. FIG. 3 shows by hatching a simplified view of the stirred region of a weld. A plate 20 is stacked on a plate 10. The stacked area of the plate 10 (the upper surface) is provided with a substantially square-shaped groove 12. A raised portion 22 is provided on the upper surface of the plate 20 in the stacked area. The plate 10 is mounted on a stage 100 and is fixed on the stage 100 together with the plate 20. The plates 10 and 20 represent protruding portions of members to be joined by welding.

Friction stir welding is performed by inserting a rotary tool 50 from above the upper plate 20. The rotary tool 50 includes a large-diameter portion 51 and a small-diameter portion 52 formed on the end of said large-diameter portion. A screw thread is provided on the outer surface of the small-diameter portion 52. The rotary tool 50 is inserted with its center aligned with the center of the width of the raised portion 22. The center of the groove 12 is also located at said center. The diameter of the large-diameter portion 51 is smaller than the width of the raised portion 22. The width of the groove 12 is smaller than the diameter of the small-diameter portion 52 and the large-diameter portion 51.

Figure 2:
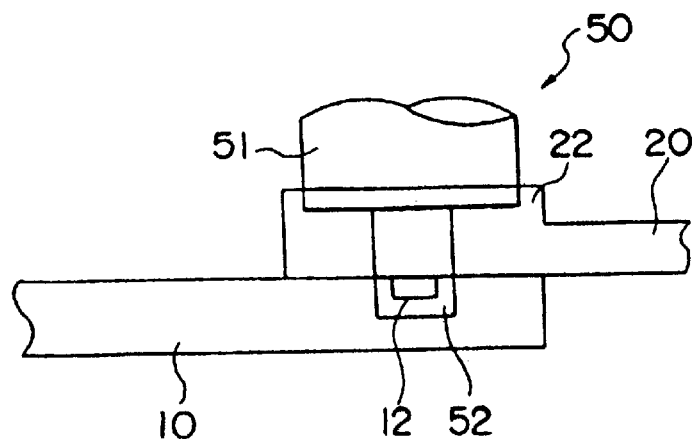
FIG. 2 is a vertical cross-sectional view showing the welding of stacked members illustrated in FIG. 1.
Figure 3:
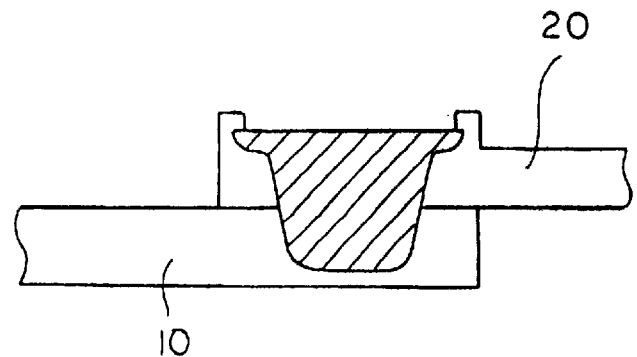
FIG. 3 is a vertical cross-sectional view showing the state of the weld after the friction stir welding of the stacked members illustrated in FIG. 1.
Figure 4A:
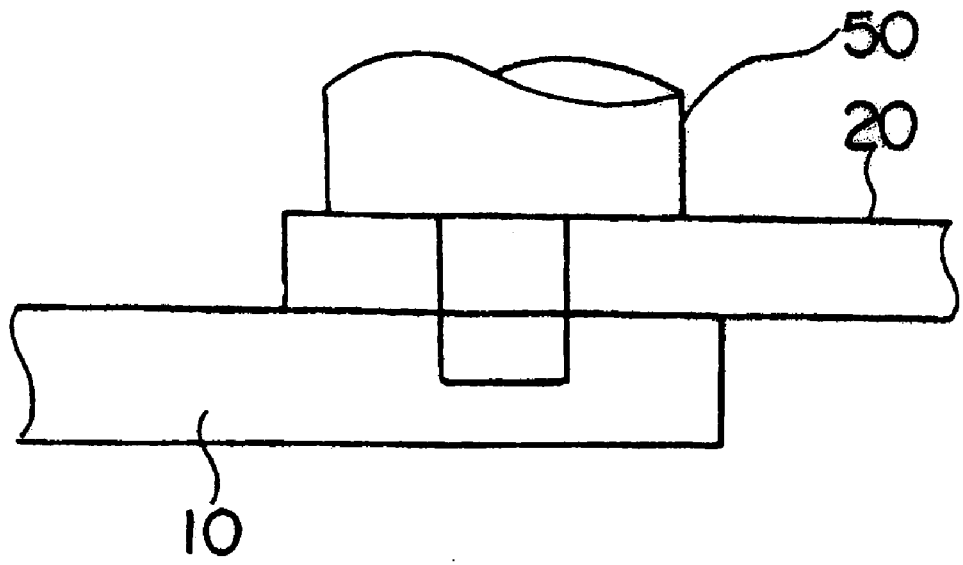
FIGS. 4(A) and 4(B) are vertical cross-sectional views showing a prior welding method.
Figure 4B:
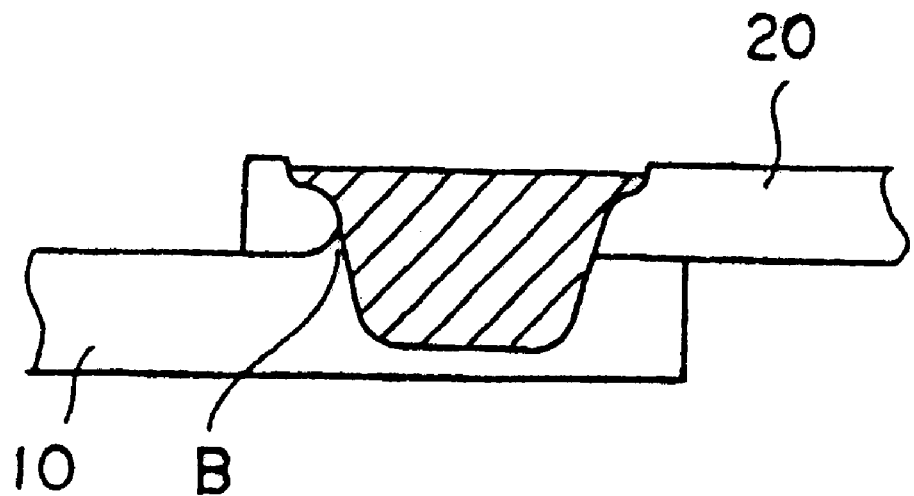

During friction stir welding, the lower end of the large-diameter portion 51 is inserted to a level between the plane of the surface of the plate 20 having the raised portion thereon and the top surface of the raised portion 22, as seen in FIG. 2. The tip of the small-diameter portion 52 is inserted to a point deeper than the bottom of the groove 12. In this state, the rotary tool 50 is rotated and moved along the welding line. The axial center of the rotary tool 50 is angled so that the small-diameter portion 52 is positioned ahead of the large-diameter portion 51 in the direction of movement of the tool.

According to the present invention, the existence of the space formed by the groove 12 prevents the pressure of the stirred region from being excessive, and prevents the generation of a notch B.

Moreover, the groove 12 is filled up during the friction stir welding. The metal material constituting the raised portion 22 is plasticised and fills the groove 12. If the raised portion 22 does not exist, the upper surface of the plate 20 is scraped and the plate becomes thin; however, since the present embodiment is equipped with the raised portion 22, the scraped portion is compensated by the material of the raised portion 22, making it possible, as a result, to reduce the plate thickness of the plate 20 as a whole.

The technical scope of the present invention is not limited to the terms used in the claims or in the summary of the present invention, but is extended to a range in which a person skilled in the art could easily find equivalents based on the present disclosure.

According to the friction stir welding method of the present invention, a lightweight joint having good characteristics is achieved.

We claim:

1. A friction stir welding method comprising the steps of:
    stacking a first member on a second member, the stacked surface of said second member having a groove formed along the direction in which friction stir welding is to be performed; and
    friction stir welding said stacked first and second members to each other along said groove using a rotary tool including a small-diameter portion having a diameter greater than the width of said groove; wherein
the first member has a raised portion, in a direction toward rotary tool, overlying the groove, wherein
the center of the width of the groove is aligned with the center of the width of the raised portion, wherein
the center of the rotary tool is aligned with the center of the width of the raised portion and with the center of the width of the groove, during said friction stir welding.

2. A friction stir welding method according to claim 1, wherein said friction stir welding is performed by inserting said small-diameter portion from said first member to a depth deeper than the depth of said groove.

3. A friction stir welding method according to claim 1, wherein said groove is in the surface, of the second member, adjacent the first member.

4. A friction stir welding method according to claim 1, wherein said groove has a square shape in cross section.

5. A friction stir welding method according to claim 1, wherein the rotary tool includes a large-diameter portion extending from the small-diameter portion, in a direction away from the first and second members, and forming a shoulder with the small-diameter portion, the raised portion having a greater width than the diameter of the large-diameter portion.

\* \* \* \* \*